UNITED STATES PATENT OFFICE.

FRANK F. BROWER AND GEORGE C. CAMPBELL, OF OTTAWA, ILLINOIS.

IMPROVED METHOD OF DISINTEGRATING AND DESULPHURIZING GOLD, SILVER, AND COPPER ORES.

Specification forming part of Letters Patent No. 52,132, dated January 23, 1866.

*To all whom it may concern:*

Be it known that we, FRANK F. BROWER and GEO. C. CAMPBELL, of the city of Ottawa, county of La Salle, and State of Illinois, have discovered a new and Improved Method of Disintegrating and Desulphurizing Gold, Silver, and Copper Ores, and separating the baser metals therefrom, so that the gold, silver, and copper may be readily and economically gathered; and we do hereby declare that the following is a full and exact description thereof.

The nature of our invention consists in disintegrating and desulphurizing gold, silver, and copper ores, which are found in combination with quartz or silex, by smelting the quartz or silex in a kiln or retort, in combination with soda or other suitable flux, and then immersing the fused mass in water.

To enable others skilled in the art to practice our invention, we will proceed to describe our mode of carrying it into effect.

We place the ore to be operated upon in a kiln or retort, in combination with about one-tenth its weight in common carbonate of soda, or soda-ash, the ore and soda being deposited in alternate layers, and the soda slightly moistened. Then heat the mass till it fuses, and then precipitate it into a body of cold water, a trough of running water being preferable. Complete disintegration and desulphurization will immediately be effected, the earthy portions being deposited at the bottom of the water in the form of a fine powder, and the sulphur rising to the top in a frothy cream.

In lieu of soda any other alkaline substance may be used which will serve as a flux and cause the quartz or silex to fuse, as potash, for instance, or even wood-ashes or common salt may be used with some effect. We do not, therefore, limit ourselves to the use of soda as a flux; but

What we claim as our invention, and desire to secure by Letters Patent, is—

The within-described method of disintegrating and desulphurizing ores found in combination with quartz or silex, by smelting them in combination with carbonate of soda or other suitable flux, and then precipitating the fused mass into water, substantially as described.

GEO. C. CAMPBELL.
    FRANK F. BROWER.

In presence of—
 CHAS. F. BUTLER,
 S. W. MORSE.